(12) United States Patent
Amajoyi

(10) Patent No.: US 10,575,532 B2
(45) Date of Patent: Mar. 3, 2020

(54) CHICKEN SKINNER

(71) Applicant: Cecilia Amajoyi, Lakeland, TN (US)

(72) Inventor: Cecilia Amajoyi, Lakeland, TN (US)

( * ) Notice: Subject to any disclaimer, the term of this patent is extended or adjusted under 35 U.S.C. 154(b) by 0 days.

(21) Appl. No.: 15/887,697

(22) Filed: Feb. 2, 2018

(65) Prior Publication Data

US 2019/0239523 A1 Aug. 8, 2019

(51) Int. Cl.
  A22B 5/00 (2006.01)
  A22B 5/16 (2006.01)
  A22C 21/00 (2006.01)

(52) U.S. Cl.
  CPC .......... *A22B 5/168* (2013.01); *A22C 21/0092* (2013.01)

(58) Field of Classification Search
  CPC .............. A22B 5/00; A22B 5/16; A22B 5/168
  USPC .................................. 452/102–105, 132, 133
  See application file for complete search history.

(56) References Cited

U.S. PATENT DOCUMENTS

| | | | | |
|---|---|---|---|---|
| 1,369,207 A * | 2/1921 | Wilson | ..................... | A47J 43/25 241/168 |
| 1,660,748 A * | 2/1928 | Frost | ..................... | A22C 25/025 452/103 |
| 1,706,403 A * | 3/1929 | Huot | ..................... | A22C 25/025 452/105 |
| 1,726,326 A * | 8/1929 | Wallace | ............... | A22C 25/025 30/353 |
| 2,279,139 A * | 4/1942 | Johnson | ............... | A22C 25/025 452/103 |
| 2,536,065 A * | 1/1951 | Kollander | ............ | A22C 25/025 119/625 |
| 3,885,271 A * | 5/1975 | Kollander | ............ | A22C 25/006 30/136 |
| 4,258,452 A * | 3/1981 | Adcock | ................ | A22C 25/025 452/105 |
| 4,297,765 A * | 11/1981 | Altman | .................. | A22C 25/02 401/207 |
| 5,230,652 A * | 7/1993 | Alam | ...................... | A22C 25/02 452/105 |
| 7,625,268 B2 * | 12/2009 | Durjan | .................... | B26B 13/22 452/103 |

\* cited by examiner

Primary Examiner — Richard T Price, Jr.

(57) ABSTRACT

A chicken skinning handheld kitchen tool of a unitary structure is provided. In some embodiments, the present invention may provide for conically shaped kitchen tool with a ridged base member and a top member having teeth or tine extending therefrom and curving downward at a variable angle of 45 to 90 degrees. The present invention may be made from a thermoplastic polymer that is sufficiently rigid to withstand forces that would normally be applied without breaking and sufficiently flexible so that it will flex during operation.

7 Claims, 4 Drawing Sheets

CHICKEN SKINNER

CROSS-REFERENCE TO RELATED APPLICATION

This application claims priority to U.S. Provisional Application No. 62/454,73 filed Feb. 3, 2017, the disclosure of which, including any materials incorporated by reference therein, is incorporated herein by reference in its entirety.

TECHNICAL FIELD

The present invention relates generally to kitchen tools, and more specifically a kitchen tool for removing excess fat and skin from chicken.

BACKGROUND

Removing the excess skin and fat from chicken prevents people from consuming artery clogging fat, which helps prevent coronary artery disease or heart attacks. Efforts to reduce the consumption of excess chicken skin and chicken fat include purchasing skinless chicken or manually removing the skin and fat manually, with a knife, or with scissors, which are each arduous tasks. Although consumers are able to purchase skinless chicken from grocery stores, skinless chicken is more expensive and is not always a financially feasible solution for people on a budget. Very few kitchen tools are equipped to successfully remove excess chicken skin and fat with ease. Therefore, a need exists for a specially designed kitchen tool that can be used to remove excess skin and fat from chicken.

Various attempts to solve this problem have been made. One such attempt can be seen with respect to U.S. Pat. No. 4,697,307 A, incorporated by reference in its entirety herein, which generally discloses a machine operated chicken skinner. While this disclosure does provide for removing excess skin and fat from chicken, it fails to provide for a means for a handheld kitchen tool, and is also not configured to allow for everyday consumer use.

Another attempt can be seen with respect to U.S. Pat. No. 8,272,927 B2, incorporated by reference in its entirety herein, which generally discloses shoulder and neck skinner for poultry. While this disclosure does provide for a means of removing skin from chicken, it fails to provide for a handheld kitchen tool, and is also not configured to allow for everyday consumer use.

Another attempt can be seen with respect to U.S. Pat. No. 9,480,263 B2, incorporated by reference in its entirety herein, which generally discloses a skinning device for removing skin from an animal carcass. While this disclosure does provide for a chicken skinning device, it fails to provide for a handheld kitchen tool, and is also not configured to allow for everyday consumer use.

Yet another attempt can be seen with respect to U.S. Pat. No. 8,840,448 B1, incorporated by reference in its entirety herein, which generally discloses a skinning device to facilitate the removal of skin and/or rib bones from fish. While this disclosure does provide for a means to remove skin, it fails to provide for a means to remove chicken skin, which varies in texture and fat content from fish skin, and is considerably more difficult to remove.

Various attempts have been made to solve the problems which may be found in the related art but have thus far been unsuccessful. A need exists for a new every day handheld kitchen tool to remove excess skin and fat from chicken legs, breasts, and thighs.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

The present invention relates to a handheld kitchen tool configured to assist in the removal of excess skin and fat from chicken.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a handheld kitchen tool configured to assist in the removal of excess skin and fat from chicken. The general purpose of the present invention, which shall be described subsequently in greater detail, is to allow a user to skin chicken with ease. The features of the invention which are believed to be novel are particularly pointed out and distinctly claimed in the concluding portion of the specification. These and other features, aspects, and advantages of the present invention will become better understood with reference to the following drawings and detailed description.

An object of the present invention is to provide a handheld kitchen tool for removing excess skin and fat from chicken that is sturdy, strong, and flexible. This objective may be obtained by molding the handheld kitchen tool with a plastic material such as a thermoplastic polymer. By utilizing a material such as a thermoplastic polymer, the handheld kitchen tool may be dishwasher safe, eliminating the risk of contamination from rust. The handheld kitchen tool may also be made from stainless steel.

In one embodiment, the present invention may provide for a conically shaped handheld kitchen tool. The conical shaped handheld kitchen tool is designed to remove excess skin and fat from chicken. The present invention may also provide a base end of the conically shaped handheld kitchen tool with a series ridges at the base end which may provide a means to grip the handheld kitchen tool securely from the base end.

In another embodiment, the top member of the present invention provides for teeth or tine bent at an angle between 45 and 90 degrees and are spaced at least ¼ inch apart. In accordance with the principles of the present invention, the teeth or tine are sufficiently rigid to withstand forces that would normally be applied without breaking and sufficiently flexible so that it will flex during operation and not tear through the meat of the chicken itself.

To use the present invention, a user may simply hold the ridged base member of the handheld kitchen tool in one hand and the selected piece of chicken in the other. While holding the chicken firmly, a user would place the teeth or tine of the present invention on the chicken skin and pull the handheld kitchen tool down and away from the chicken. The user would continue to use the present invention to grasp and pull the skin from the chicken, while rotating turning the chicken, until all skin has been removed. Once removed, the excess skin and fat can be discarded and the present invention may be cleaned and washed for reuse.

The unique features of the present invention may provide the following benefits for one or more consumers: it is easier, safer, and more efficient to use than a knife or scissors.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective means and method for removing excess skin and fat from chicken.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment," "at least one embodiment," or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well known features, elements or techniques may not be shown in detail in order not to obscure the embodiments.

Figure 1:
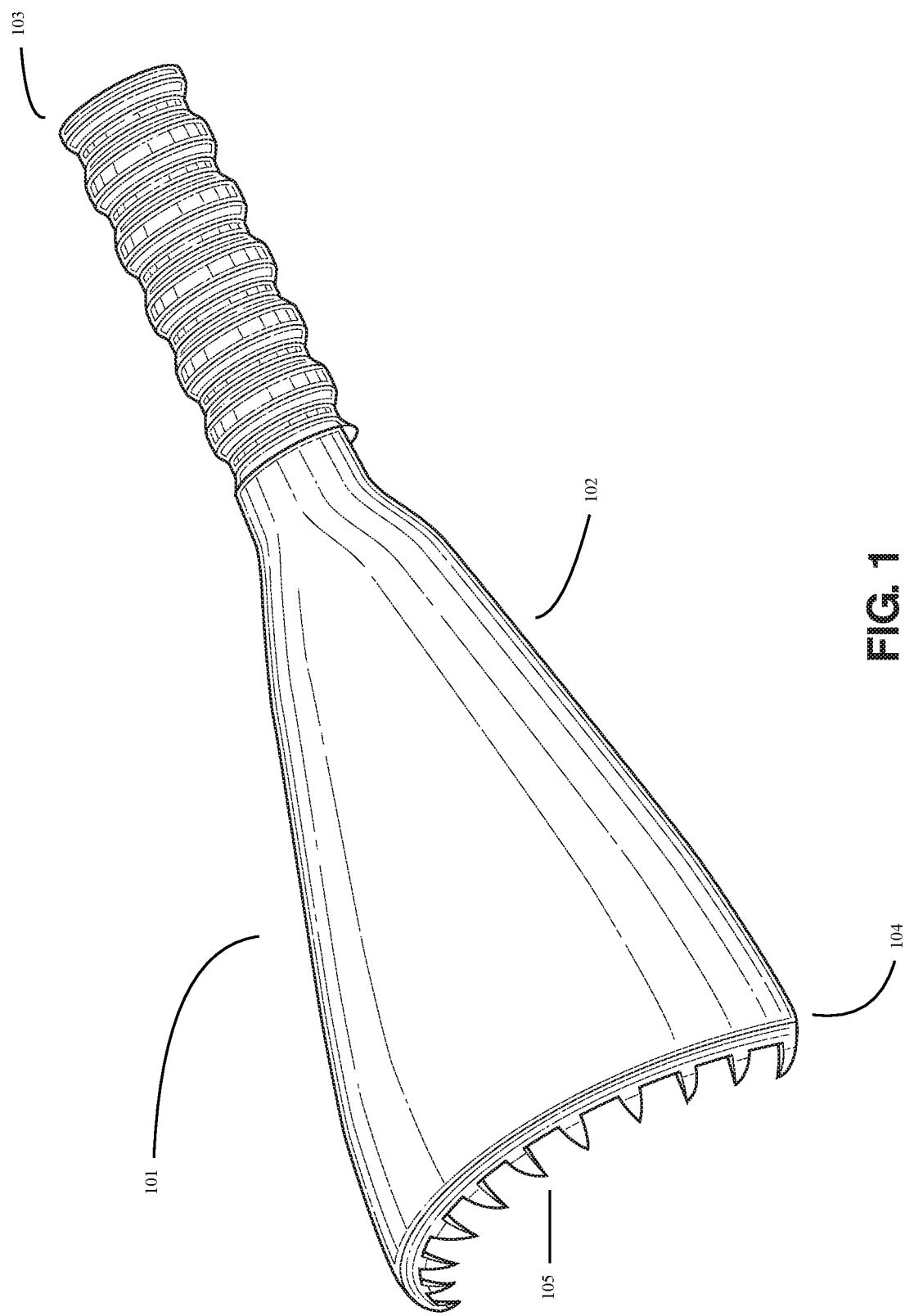
FIG. 1 shows a perspective view of a chicken skinning handheld kitchen tool in accordance with at least one embodiment of the invention.

Turning attention to FIG. 1, a perspective view of a chicken skinning handheld kitchen tool in accordance with at least one embodiment of the invention is shown. In the embodiment depicted, a viewer may perceive a chicken skinning handheld kitchen tool 101, with an integrated conically shaped main body 102, having a ridged base member 103, with a top member 104 having a plurality of teeth or tine 105 that extend downward and away from the top end 106 of the conically shaped main body 102.

Figure 2:
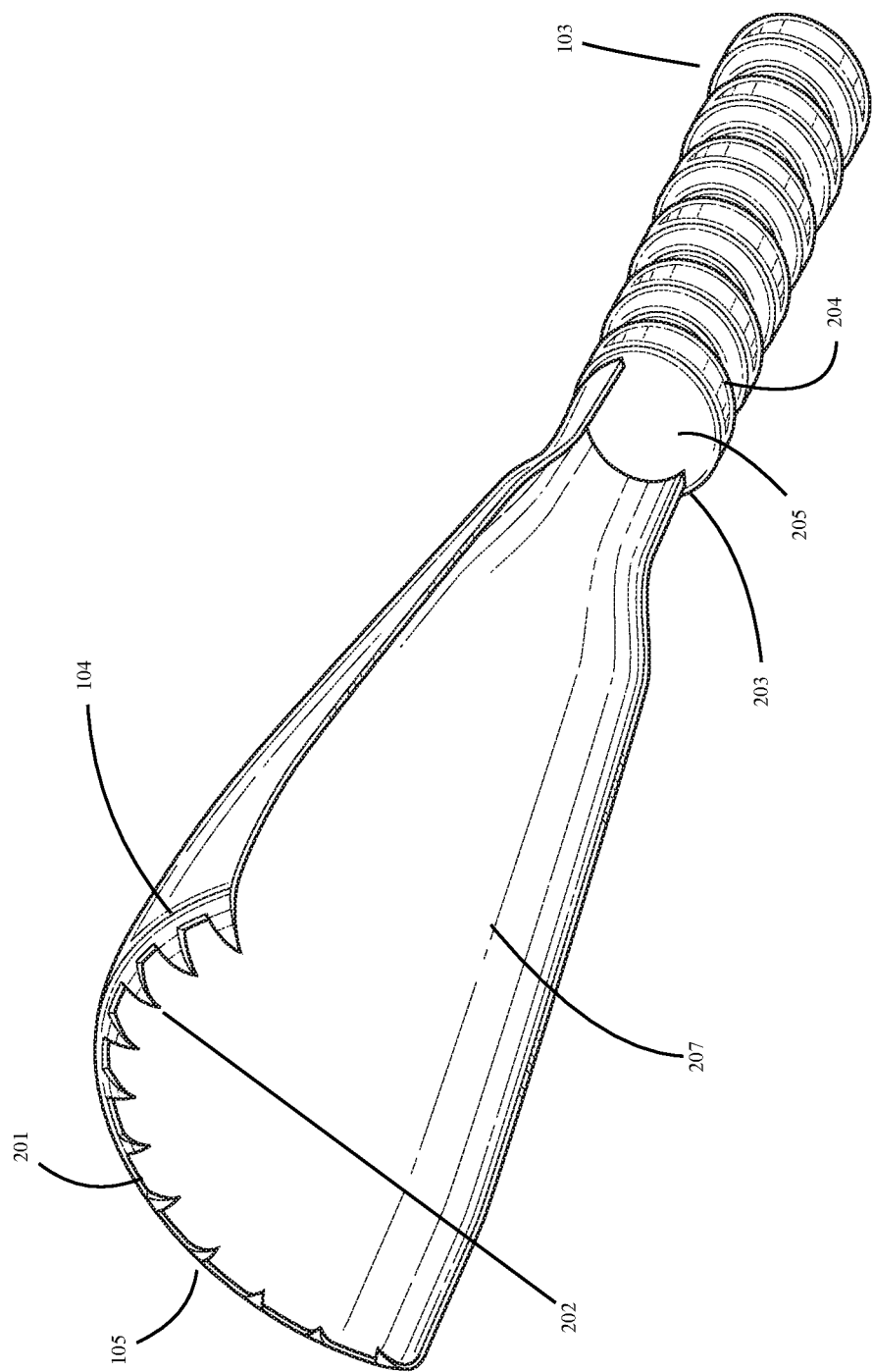
FIG. 2 shows a right perspective view of a chicken skinning handheld kitchen tool accordance with at least one embodiment of the invention.

With respect to FIG. 2, a right perspective view of a chicken skinning handheld kitchen tool in accordance with at least one embodiment of the invention is shown. In the embodiment depicted, a viewer may perceive a plurality of teeth or tine 105 that are at least ¼ inch apart 201, having a sharp edge point 202 that extends at least ½ inch from edge of the top member 104. While the top surface 106 curves outwardly, the inner surface open cavity 207 of the conically shaped main body 102 curved inwardly. A viewer may also perceive that the narrowed end 203 of the conically shaped main body 102 is fixably attached to the ridged base member 103. The top end 204 of the ridged base member 103 is a flat spherical shaped end 205. When holding the present invention with the inner surface open cavity 207 facing up, a viewer may also perceive that the narrowed end 203 of the conically shaped main body 102 is fixably attached to at least half of the circumference of the flat spherical shaped end 205.

Figure 3:
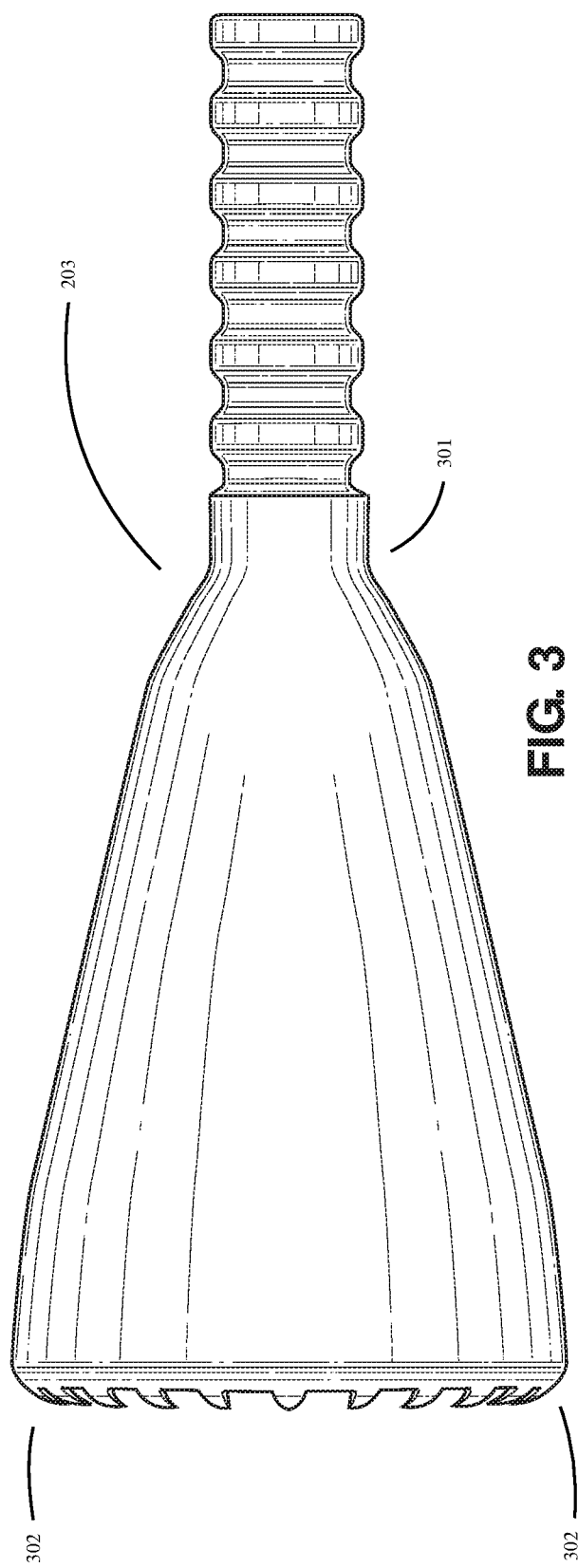
FIG. 3 shows a front view a chicken skinning handheld kitchen tool in accordance with at least one embodiment of the invention.

Turning attention to FIG. 3, a front view of a chicken skinning handheld kitchen tool in accordance with at least one embodiment of the invention is shown. In the embodiment depicted, a viewer may perceive that the narrow end 203 of the chicken skinning handheld kitchen tool 101 narrows at an angle of at least 45-degrees 301 until it fixably attaches to the ridged base member 103. A viewer may also perceive that the plurality of teeth or tine 105 curve downward 302 away from the top end of the chicken skinning handheld kitchen tool 101.

Figure 4:
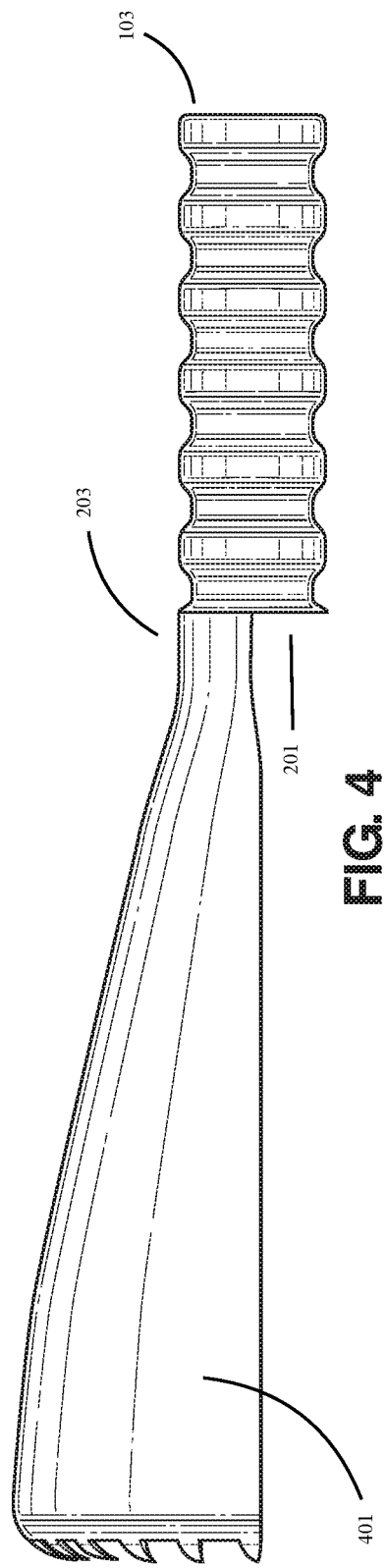
FIG. 4 shows a side view of a chicken skinning handheld kitchen tool in accordance with one embodiment of the invention.

With respect to FIG. 4, a side view of a chicken skinning handheld kitchen tool in accordance with one embodiment of the invention is shown. In the embodiment depicted, a viewer may perceive the downward curvature 401 of the conically shaped main body 102 in relation to vertical shape of the chicken skinning handheld kitchen tool 101 and the positioning of the top member of the chicken skinning handheld kitchen tool 104.

Figure 5:
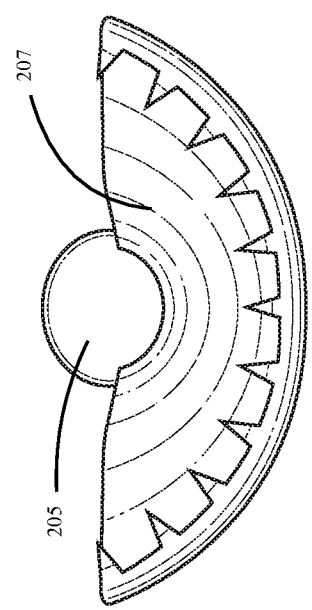
FIG. 5 shows a top view of a chicken skinning handheld kitchen tool in accordance with one embodiment of the invention.

With respect to FIG. 5, a top view of a chicken skinning handled tool in accordance with one embodiment of the invention is shown. A viewer may perceive the curvature of the inner surface open cavity 207 and the flat spherical shaped end 205.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the chicken skinning handheld kitchen tool is configured to be conically shaped with a bottom member, top member, and teeth or tine generally described herein has been disclosed in connection with a number of embodiments shown and described in detail, various modifications should be readily apparent to those of skill in the art.

What is claimed is:

1. A handheld kitchen tool for removing excess skin and fat from chicken, comprising:

a thermoplastic polymer as an integral unitary structure, and;

a handle engaging bottom member and top member, said handle engaging bottom member, and said top member having a plurality of teeth or tine extending outwardly therefrom and curving downward.

2. A handheld kitchen tool of claim 1, wherein the handle engaging bottom member has at its top end a flat surface.

3. A handheld kitchen tool of claim 2, wherein the handle engaging bottom member's top end flat surface is fixably attached to the bottom end of the top member.

4. A handheld kitchen tool as recited in claim 1, wherein the plurality of teeth or tine extending from the top member have a sharp edge point that extends at least ½ inch from top member edge.

5. A handheld kitchen tool as recited in claim 2, wherein the teeth or tine extending from the top member are spaced at least ¼ inch apart.

6. A handheld kitchen tool as recited in claim 2, wherein the teeth or tine extending from the top member are triangular or cone shaped.

7. A handheld kitchen tool of claim 1, wherein the body is conically shaped on the y-axis and curves in a semi-circle on the x-axis.

* * * * *